Nov. 26, 1940.          R. C. UPTON          2,223,138
MOLTEN BATH FURNACE

Filed May 1, 1939

INVENTOR.
RICHARD C. UPTON
BY
Whittemore Hulbert & Belknap
ATTORNEYS

Patented Nov. 26, 1940

2,223,138

UNITED STATES PATENT OFFICE 2,223,138

MOLTEN BATH FURNACE

Richard C. Upton, Mount Clemens, Mich., assignor of one-half to Commerce Pattern Foundry & Machine Company, Detroit, Mich., a corporation of Michigan Application May 1, 1939, Serial No. 271,130

6 Claims. (Cl. 13—23)

The invention relates to molten bath furnaces of the type in which heat is supplied to the bath by the passage of electrical current therethrough. More particularly, the invention relates to furnaces of this type in which molten salt baths are used and are held in metal pots. It is the object of the invention to obtain an improved construction, avoiding certain defects of furnaces heretofore used and obtaining various advantages as hereinafter set forth.

The use of an unlined metal pot to contain the molten salt or liquid which is heated by the passage of an electric current through it, limits the effective length of the circuit through the liquid for the heating current because while the electrodes must be placed near the pot itself, in order not to occupy the space needed for immersing the material to be heated in the bath, the close proximity of the metal walls of the pot to the electrodes effectively shunts the heating current from passing through the bath from electrode to electrode, if the distance between the electrodes is greater than the sum of the distances from each electrode to the walls of the pot. This requires all the heating of the liquid to be done in a relatively small part of the bath, i. e., between the electrodes themselves placed close together or between the electrodes and the pot itself if such distances are electrically shorter than the electrode spacing. This not only localizes the heat, but requires a heavy current to supply the heat to the bath since the voltage is as relatively low as the length of path for the current is short, and heavy currents require large electrodes and heavy conductors external to the bath, both of which are costly.

Another disadvantage of using a metal pot in direct contact with the molten salt, and especially at high temperatures, is that there is a rapid oxidation of the pot walls and a dissolving of the resulting metal oxides in the bath resulting in changes in the composition of the bath and rapid deterioration of the pot itself.

The use of a refractory other than the metal for the container of the liquid, while it will with a suitable refractory not chemically affected by the liquid, afford avoidance of these disadvantages, the mechanical advantages inherent in the metal for forming a non-leaking receptacle or container for the liquid are sacrificed in the inherent weakness of the refractories in this respect.

The refractory however, if it is, as most of them are, relatively a non-conductor of electricity with respect to the liquid, may be used to afford mechanical support to the electrodes which may be placed directly against it. This is a distinct advantage because at the temperature (within one or two hundred degrees Fahrenheit of the melting point of the electrodes) at which some of these baths must be maintained, the electrodes, being as they are, in direct contact with the hottest part of the liquid, are often in a state where their tensile strength is very low and are liable to break off when unsupported and especially when they are immersed in the bath at an angle from the perpendicular as they should be unless placed very close together for the following reasons: The electrical conductivity of the liquid bath increases and its specific gravity decreases as the temperature rises, hence the hotter and more conductive liquid is at the top of the bath with the result that the bottom of the bath will be relatively cool, because most of the heating current will be shunted through this more highly conductive top part. Placing the electrodes very close together will result in the magnetic force, due to the flow of the heavy current lengthwise of the electrodes and transversely between them in the liquid, throwing the liquid downward toward the bottom of the pot instead of allowing it to first rise toward the top due to convection. To avoid the need of heavy external conductors and large electrodes required in such an arrangement because of the heavy currents and low voltage required by such a short current path in the liquid, and to effect proper heating of the bottom of the bath, the electrodes should be spaced far apart and with their lower ends resting on the very bottom of the pot and with their lower ends closer together than their upper ends. This will produce even bath temperature, due to greater heating in the shorter bottom circuit accompanied by rapid convection currents in the bath due to this.

With a refractory lining for the pot relatively non-conducting electrically with respect to the liquid itself the lower ends of the electrodes may rest directly on the bottom of the pot and may diverge as much as necessary at the top. Moreover, if the refractory lined pot be so shaped the electrodes may rest for their full length against the sides of the pot at the correct angle of divergence with their bottom ends supported directly on the bottom lining. Thus, they would be so fully supported that they could be operated without damage at such temperatures as would otherwise result in their breaking off. This means the use of smaller and cheaper electrodes of longer life.

In view of conditions as above set forth, my invention consists: First in using a metal container or pot to form the non-leaking receptacle and lining the same with a suitable refractory on the inside which will serve to effectively insulate the conducting walls of the metal pot from the electric circuit through the liquid and retard the oxidizing action of the molten salt on the pot material; Second, in sloping the walls of the pot outward from bottom to top primarily to provide for the refractory lining being held against the metal walls of the sides of the pot by the force of gravity, and also, however, to provide a support for the electrodes which will maintain them at the proper angle of divergence. The cracking of the lining material will not do any damage in a construction of this sort, since the broken sections will have no tendency to be displaced and fall into the bath. The refractory may be made, as shown in the drawing, in the form of tiles, though it may be formed on the walls and bottom as a plastic lining as well.

The outside walls of the metal pot are also enveloped in a refractory material to keep the hot metal out of contact with the air, thus reducing oxidization on the outside. These outside refractories are of suitable mechanical strength and further reinforced by brick walls and steel bucks to afford proper support for the metal pot, allowing its being made with a lighter section than would be required without this support.

Figure 1:
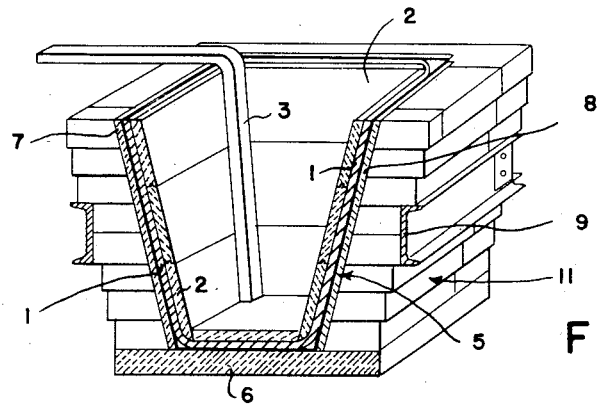
Figure 1 is a sectional perspective view of my improved furnace.
Figure 2:
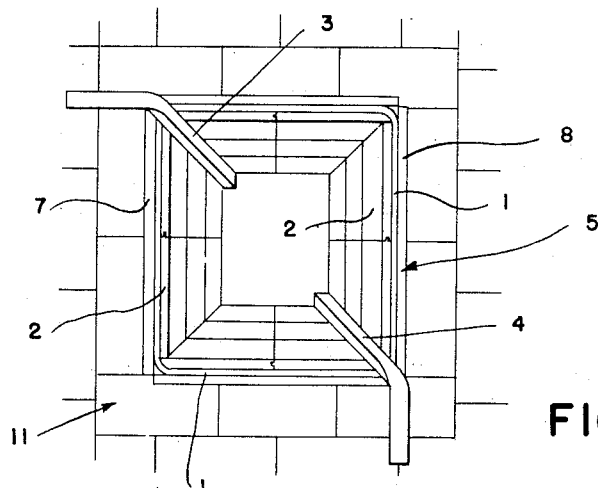
Figure 2 is a plan view with the heat insulating cover removed.

1 represents the walls of the metal pot, 2 the lining thereof, and 3 and 4 two separated immersed electrodes, the outer ends of which are adapted to be connected to the conductors of an external circuit (not shown). The whole is surrounded by the insulating hearth material 5. The side walls of the metal pot slope at an angle preferably of about 14½ degrees outward from the perpendicular on all four sides. 6 is a slab of carborundum or other refractory, as are also 7 and 8. These are used as mechanical support for the metal pot and are separated from it by a thin layer of a more plastic refractory, such as chromium oxide to provide a more effective protection from the air. The structural steel buck 9 is placed about midway between top and bottom as a retaining support to the insulating brick walls 11, which are laid up in refractory mortar. These afford the necessary support to the steel pot. The electrode 3 lies in the corner of the bath and is supported for its full length on two sides by the refractory walls, the lower end resting on the bottom. The angle of these walls must be of great enough value to insure the refractory being held definitely against the metal pot by gravity, and to provide that the electrodes lying against it have sufficient slope with respect to their cross section and conductivity that the electrical resistance of that part of them which is immersed in the bath must be less than the difference between the resistance of the long current path across the wide upper surface of the bath and that of the short current path across the bottom of the bath at the lower ends of the electrodes. This will insure ample current flow through the bottom of the bath and prevent this part of the bath being relatively cold. Even though the bottom currents are heavier than necessary, convection of the liquid will prevent the bottom from becoming too hot. The slope angle is not, therefore, too critical as regards exact value.

Figure 3:
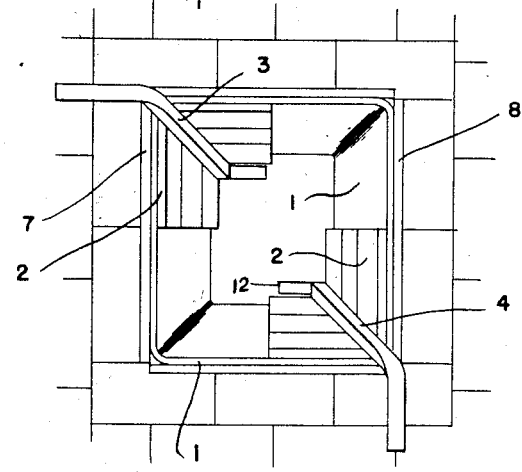
Figure 3 is a similar view showing a slightly modified construction.

In Figure 3 I have shown a modified construction in which the refractory material does not form a complete lining for the pot, but extends a distance on opposite sides of the electrode and between the same and the metallic wall. This will effectively prevent short-circuiting of the current. Another modification in construction is the extension 12 of the electrodes along the bottom of the pot to afford additional bottom heating where such may be necessary, as in a pot of greater relative width and less depth.

What I claim as my invention is:

1. In a furnace for containing electrically heated fluids of the type in which electrical conductivity increases with temperature, a container for the fluid having walls inclining outward from the bottom upward, and electrodes immersed in the fluid and resting against the inclined walls.

2. In a furnace for containing electrically heated fluids of the type in which electrical conductivity increases with temperature, a metallic container for the fluid having walls inclining outward from the bottom upward, a lining for said container of non-metallic refractory material, and electrodes immersed in the fluid and resting against the inclined refractory lining.

3. In a furnace for containing electrically heated fluids of the type in which electrical conductivity increases with temperature, a metallic container for the fluid substantially rectangular in plan and having walls inclining outward from the bottom upward, a lining for said container of non-metallic refractory material, and electrodes immersed in the fluid arranged in diagonally opposite corners of the container and resting against the inclined refractory lining.

4. In a furnace for containing electrically heated fluids of the type in which electrical conductivity increases with temperature, a container for the fluid having walls inclining outward from the bottom upward, and electrodes immersed in the fluid extending downward and resting against the inclined walls and also extending along the bottom.

5. In a furnace for containing electrically heated fluids of the type in which electrical conductivity increases with temperature, a metallic container for the fluid having walls inclining outward from the bottom upward, a lining for said container of non-metallic refractory material, and electrodes immersed in the fluid having portions resting against the inclined refractory lining and portions extending along and resting upon the bottom to increase the area in contact with the fluid layer adjacent to said bottom.

6. In a furnace for containing electrically heated fluids of the type in which electrical conductivity increases with temperature, a metallic container for the fluid having walls inclining outward from the bottom upward, a non-metallic refractory lining for said container formed of separate blocks resting one upon another in stable position against said inclined walls and electrodes imersed in the fluid and resting against the inclined refractory lining.

RICHARD C. UPTON.